United States Patent Office 2,730,499
Patented Jan. 10, 1956

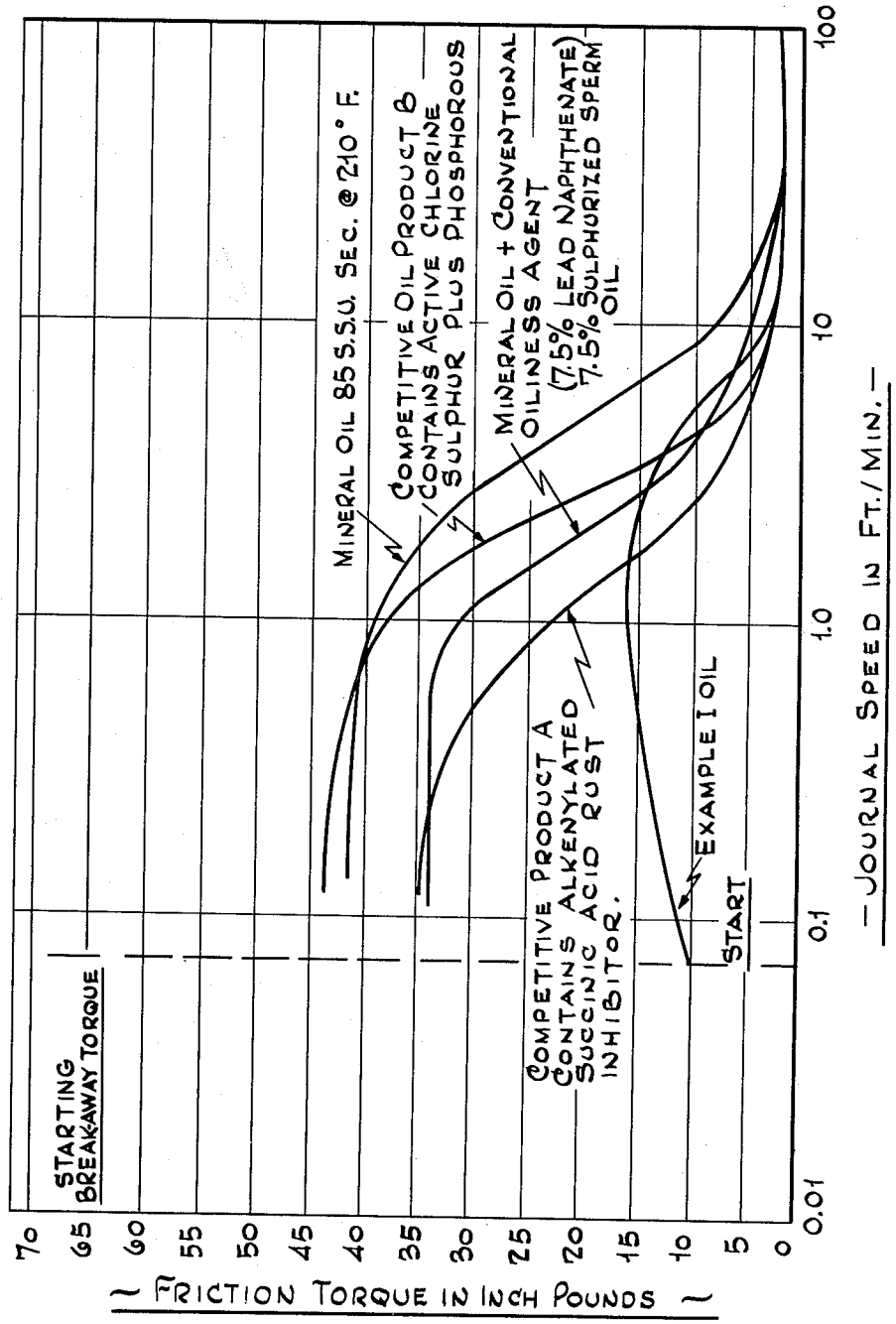

2,730,499
LUBRICANTS FOR HEAVY JOURNAL BEARINGS OPERATING AT ELEVATED TEMPERATURES

Oldrich S. Pokorny, Sarnia, Ontario, Canada, assignor to Esso Research and Engineering Company, a corporation of Delaware Application August 1, 1951, Serial No. 239,659

1 Claim. (Cl. 252—49.8)

The present invention relates to an improved lubricant for heavily loaded bearings especially journal bearings of the bronze to steel journal or, more particularly, those of the tilting-pad bearing type. It relates especially to lubricants for such bearings which are operated at comparatively high temperatures. A particular application of the invention relates to lubricants for the Michell type tilting-pad bearings which, under the usual boundary lubrication conditions existing during starting, and during very low speed operation at temperatures ranging between 175° F. and 350° F., do not function in accordance with the hydrodynamic principle for which such bearings were designed. This departure from design conditions in such bearings is at least partly due to the influence of the frictional forces which act upon the tilting-pad slider at very low speeds.

A particular application of the composition of the present invention is the lubrication of the heavy journal bearings in the dryer section of paper manufacturing machinery, and the like. It is obvious, however, that other comparable machinery may be lubricated advantageously with the same composition. Due to heavy demands for newsprint paper during recent years, the large machines used for making and drying paper at relatively high speeds have been stepped up in speed and production capacity with resultant lubrication problems. In order to dry newsprint paper, e. g., at the speeds of modern machinery, from 1500 to 2000 feet surface speed per minute, it has been found necessary either to increase the temperature of the dryer rolls or to lengthen the dryer section by installing additional dryer rolls. Since there are practical limitations to the length of the dryer section in a modern paper machine, an increase in the operating temperature of the dryer rolls has been found to be more advantageous. Formerly, the dryer rolls of paper machines were heated with steam at a pressure of about 12 p. s. i. g. Because of the increase in the speed of operation, it has been necessary in more recent operations to increase steam pressure to a range between about 20 and 30 p. s. i. g. and sometimes even slightly higher. As a consequence, the temperature of the saturated steam has been increased in some important installations from approximately 240° F. to between 258° F. and 275° F.

The resulting high operating temperatures in the dryer section of the paper making machinery have greatly aggravated difficulties which have been encountered in starting such machinery after emergency shutdowns. Apparently, the heat capacity of the dryer roll is so high that if the dryer section is shutdown, the temperature of the journal bearing rapidly rises due to thermal conductivity from approximately 130° F. to within 10–30° F. of the steam temperature, even though the flow of steam was immediately cut off. Conventional lubricants no longer have sufficient viscosity and adhesion to be retained between the surface of the journal and bearing pad. Since the oil film of the lubricant cannot support the bearing load, the lubricant is squeezed out so that the bearing surfaces are no longer completely separated by an oil film. This transition from the hydrodynamic to boundary lubrication is relatively fast, occurring within 3 to 10 minutes after emergency shutdown. Frequently it has been found almost impossible to start the dryer section of the paper machine with conventional electric drive a few minutes after stopping due to the high friction torque. This high torque appears to be caused, at least in part, by the metal to metal contacts in the region of boundary lubrication. It appears to be partially due also to the "braking" action of the tilting pads in the Michell type bearings due to the forces acting on the bearing shoe (pad) which determine its angle of inclination. In some instances it has been found necessary to allow the bearing to cool for twenty or more minutes before the oil film between the rubbing surfaces, which gradually becomes reestablished, could return to sufficient thickness to support the load, thus reducing the friction torque to the point where the torque developed by the electrical drive made starting possible. While the motors of the electric drive are designed for some over-load starting, the starting currents frequently reach 6000 amperes on 100–115 volt D. C. motors rated at 250 H. P.

Also, in the operation of newsprint paper machinery it is often necessary to adjust the tension on the felt. This is done by operating the machine at a very low speed, i. e. "inching," while the tension rolls are being adjusted. With conventional lubricants, the frictional resistance of hot journals and bearings at such low speed operation is excessively high and the dryer section must be operated at somewhat higher speeds than is desirable, to prevent stalling of electric motors. Power consumption is high under such conditions and large motors of the electrical drive are often damaged because of prolonged overloading.

According to the present invention, the break-away starting torque and also the friction resistance at very low speeds in standard paper machinery and similar equipment may be very materially reduced by adding to the conventional mineral lubricating oil small quantities of an "oiliness" agent, one component of which is a long chain fatty acid having at least 16 carbon atoms. In addition to this oiliness agent, a long chain hydrocarbon substituted dicarboxylic acid or mercapto aliphatic acid is employed, being used in proportions of 0.01 to 2%, preferably 0.05 to 0.5%, by weight, based on the total composition. An example of a particularly effective "oiliness" agent is a mixture of substantially equal parts of palmitic and stearic acids. A second desirable component of the "oiliness" agent is the load-bearing agent used in a concentration of 0.1 to 5%, preferably 0.5 to 3.0% by weight such as tricresyl phosphate. Instead of tricresyl phosphate, other triesters of phosphoric acid may be used. Corresponding, esters of phosphorous acid may be used, though not as effective, and chlorinated paraffin wax containing 25 to 40% of chlorine by weight, methyl dichloro stearate, and the like, may be used with or in lieu of the phosphorus type esters to reduce wear in parts under high unit pressures such as steel to steel gearings, and the like.

For general purposes, a mineral base lubricating oil having a viscosity between about 50 and 200 S. S. U. at 210° F. is preferred though non-mineral oils can be used. The oil has added thereto from about 0.05 to 1%, preferably 0.1 to about 0.5% of the substantially saturated fatty acids having preferably 16 and not more than about 26 carbon atoms, plus 0.01 to 1%, preferably 0.02 to 0.2% by weight, of the long chain substituted dibasic acid or mercapto-acetic acid. To these is added 1 to 10% by weight, preferably not more than about 3%, of the load-bearing composition, such as tricresyl phosphate or the active chlorine type materials mentioned above and others which are well-known in the art, such as active sulphur type compounds.

EXAMPLE I

A composition was formulated according to the present invention of the following constituents. Percentages by weight are indicated.

| | Percent |
|---|---|
| Solvent refined mineral oil, 85 S. S. U. viscosity at 210° F. | 98.94 |
| Tricresyl phosphate | 0.50 |
| Mixture of 45–55% palmitic and stearic acid | 0.30 |
| $C_{16}$ alkenylated succinic acid | 0.06 |
| Phenyl alpha naphthylamine | 0.10 |
| Di-tertiary butyl p-cresol | 0.10 |

An equivalent reduction in the break-away and low speed friction torque for brass bearing on steel journal combinations was obtained using oils formulated as follows:

EXAMPLE II

| | Percent |
|---|---|
| Solvent refined mineral oil 85 S. S. U. viscosity @ 210° F. | 98.84 |
| Tricresyl phosphate | 0.50 |
| Stearic acid | 0.10 |
| Lauryl mercapto acetic acid | 0.10 |
| Di-tertiary butyl p-cresol | 0.40 |

EXAMPLE V

| | Percent |
|---|---|
| Solvent refined mineral oil | 98.84 |
| Tricresyl phosphate | 0.50 |
| Stearic acid | 0.10 |
| Lauryl mercapto acetic acid | 0.10 |
| Di-tertiary butyl p-cresol | 0.40 |

EXAMPLE VI

| | Percent |
|---|---|
| Solvent refined mineral oil | 96.95 |
| Chlorinated wax | 2.50 |
| Cetyl mercapto acetic acid | 0.15 |
| Di-tertiary butyl p-cresol | 0.40 |

EXAMPLE VII

| | Percent |
|---|---|
| Extracted Mid-Continent SAE 20 oil | 99.35 |
| Tricresyl phosphate | 0.50 |
| Lauryl mercapto acetic acid | 0.15 |

In all the above formulas, percentages of ingredients are indicated by weight. The products of Examples VI and VII are not fully equivalent to those which omit stearic acid or equivalent. Lauric, myristic, palmitic, or higher saturated acids may be used with or in lieu of stearic acid and for some purposes the unsaturated acids such as oleic acid may be used. It is usually preferred to employ at least a very small quantity of fatty acid.

Comparative data show marked superiority for the lubricant of this invention over prior art products. These are summarized in the following table:

TABLE I
*Effect of bearing loads on friction characteristics of oils*
[Bronze to steel, journal speed 1.5 ft./min., temperature 250° F.]

| Run No. Load on Journal, p. s. i. | Mineral Oil, 85 S. S. U. at 210° F. | | Mineral Oil + Conventional Oiliness Agent [1] | | Example I | | Competitive Product A [2] | | 190 S. R. Cylinder Stock | | Competitive Product B [3] | |
|---|---|---|---|---|---|---|---|---|---|---|---|---|
| | Friction Torque, in.-lbs. | Coeff. of Frict. | Friction Torque, in.-lbs. | Coeff. of Frict. | Friction Torque, in.-lbs. | Coeff. of Frict. | Friction Torque, in.-lbs. | Coeff. of Frict. | Friction Torque, in.-lbs. | Coeff. of Frict. | Friction Torque, in.-lbs. | Coeff. of Frict. |
| 222 | 11.0 | 0.066 | 7.2 | 0.043 | 2.7 | 0.016 | 6.5 | 0.039 | 1.9 | 0.011 | 9.7 | 0.058 |
| 425 | 22.5 | 0.071 | 18.4 | 0.058 | 6.9 | 0.022 | 17.0 | 0.053 | 8.3 | 0.026 | 25.5 | 0.079 |
| 630 | 42.5 | 0.090 | 37.1 | 0.079 | 14.1 | 0.030 | 34.4 | 0.073 | 25.0 | 0.053 | 49.0 | 0.104 |
| 836 | 63.8 | 0.102 | 57.0 | 0.091 | 22.1 | 0.035 | 59.1 | 0.094 | 49.0 | 0.078 | 74.0 | 0.118 |
| 1,039 | 87.8 | 0.113 | 81.9 | 0.105 | 29.5 | 0.038 | 85.3 | 0.110 | 70.2 | 0.090 | 100.0 | 0.128 |
| 1,243 | 109.5 | 0.117 | 108.0 | 0.116 | 38.8 | 0.042 | 106.5 | 0.114 | 106.8 | 0.114 | 134.0 | 0.144 |
| 1,450 | 139.5 | 0.128 | 135.3 | 0.124 | 47.0 | 0.043 | 133.1 | 0.122 | 130.5 | 0.120 | 158.0 | 0.145 |

[1] 7.5% Lead Naphthenate, 7.5% Sulphurized Sperm Oil (unblown).
[2] Containing oxidation inhibitor and alkenylated succinic acid as rust inhibitor.
[3] Contains active chlorine-sulphur additive, also phosphorus.

EXAMPLE III

| | Percent |
|---|---|
| Solvent refined mineral oil 85 S. S. U. viscosity @ 210° F. | 96.80 |
| Chlorinated wax (35% chlorine) | 2.50 |
| $C_{16}$ alkenylated succinic acid | 0.30 |
| Di-tertiary butyl p-cresol | 0.40 |

As indicated above, the concentrations of the "oiliness" agent for brass bearings may be varied between 0.04 and 0.40% based on the weight of the total lubricant. Also, it is desirable to add a small amount of a good oiliness or load bearing agent, such as an ester of phosphoric acid, preferably 0.3 to 1.0% of tricresyl phosphate, or 0.5 to 2.5% of chlorinated wax containing 35 to 40% of chlorine. In Examples I, II and III, the oxidation inhibitors ditertiary butyl paracresol were included to retard deterioration of the oil.

EXAMPLE IV 49.75% SAE 10 mineral oil
49.10% SAE 30 mineral oil
0.15% chlorinated paraffin-naphthalene condensation product
0.50% tricresyl phosphate
0.10% lauryl mercapto acetic acid
0.10% stearic acid
0.30% ditertiary butyl paracresol (antioxidant)

It may be noted that the composition of Example I has frictional resistance of only one-third or less of the prior art products at high bearing pressures.

The present invention will be more fully appreciated when it is noted that the use of conventional "oiliness" or extreme pressure agents per se has not been effective in solving the problem of high starting friction at elevated temperatures. Thus, such materials as highly chlorinated waxes, lead naphthenate, tricresyl phosphate, sulphurized sperm oil, methyl dichloro stearate, isopropyl oleate, and the like, even in relatively high concentrations are often ineffective in reducing the bearing friction at very low speeds in paper drying machinery. Bearings in the heavy machinery of the character described are generally designed to support gravity bearing loads of the order of 200 to 250 p. s. i. g. Since the weight of the assembly is generally not uniformly distributed on the rubbing surfaces of the bearings and the assembly will not be exactly balanced at the operating temperatures in the range of 175° to 300° F., the actual bearing loads on the portion of the bearing surface which support the entire loads may exceed 450 p. s. i. and may reach up to 1450 p. s. i. Under conditions of high bearing loads some active chlorine or sulphur additives actually tend to substantially increase the break-away torque in the tilting pad bearings due to a high coefficient of friction at very low starting speeds. Probably there is some chemical reaction with the bearing metals. Even where electrical motors are able to withstand the shock of overload required for break-away, they may not be able to stand the prolonged overload of low speed driving. Under these conditions loaded motors draw increased current (amperes) at reduced voltage (due to line voltage drop), and this in turn induces excessive heating of the motors as well as lower shaft torque. The electric motors become stalled and suffer consequent serious damage due to overheating unless the power is shut off immediately.

To illustrate the magnitude of the problem which prior art lubricants have failed to solve and which have been successfully solved by the present invention, the following data have been obtained on commercial newsprint machinery. At one plant, the machinery was started up on a Sunday night with the dryer rolls relatively cold and with bearing temperatures of 90° to 125° F. The total rated load on the motors of the electric drive for dryer section was 280 kw. or about 375 H. P. No difficulty was encountered in cold starting. However, during the week, when the machine was shut down for cleaning purposes after a paper break, the dryer section could not be started within 10 to 15 minutes after shut-down due to excessive break-away friction torque. On several occasions, this instantaneous load due to the starting friction was so high that the motors, which are capable of developing 640 H. P. (475 kw.) momentarily, were stalled. Under such conditions, a starting current of 6300 amperes was recorded with an applied voltage between about 65 and 85. This did not provide enough torque to start the rolls. After allowing the dryer roll bearings to cool down for a period which varied from one-half to four hours, the required starting load was approximately 320 kw. or about 429 H. P. with bearing temperatures between 135° and 150° F. This is not a serious increase in the break-away torque.

Using the lubricant of the present invention, the starting load on the electric drive was very little higher than the regular cold starting load. In some cases starting torques have been no higher than running torque.

In another installation where a conventional lubricant, doubly inhibited to retard oxidation and rusting, was used, the electric drive would require from 5000 to more than 6000 amperes at 80 to 90 volts (crawl generator no load setting) for "hot" starting. Even then the drive stalled on several occasions. After replacing the lubricant with one of the present invention it was found that the crawl generator can be given a normal no load setting of 50 volts (or approximately 3400 amperes peak load), thus reducing the duty on the contactor from approximately 6000 amperes to 3400 amperes. In a series of performance tests it was found that the "no load" line voltage of 37½ volts was sufficient for smooth break-away of the dryer section at "cold" starting and approximately 42 volts for "hot" starting. From an electrical viewpoint, the lowering of the crawl voltage and amperage reduces duty on the dryer section contactors and prevented their being "frozen in" during crawling and "inching" of the machine while placing the felts. From the paper makers' viewpoint a lower crawl voltage means a lower crawling speed and more convenient and accurate "inching" of the dryers for the adjustment of tension on the felt.

In a third installation an extreme pressure type lubricant containing only a conventional additive, lead naphthenate, was tried as lubricant. Torque input of the electric drive was found to be insufficient to overcome friction losses in the bearings. After adding the "oiliness" additives of the present invention, the power requirement was reduced by 25% and "hot" starting troubles were completely eliminated.

Since precise measurements of the friction torque in the commercial newsprint machine are not practicable, a friction test apparatus was set up in the laboratory consisting essentially of a 120° bronze bearing mounting a one and one-half inch diameter journal to which loads can be applied by means of a lever device. Friction torque can be measured in inch-pounds for bearing loads up to 3000 p. s. i. at journal speeds from 0.1 to 500 ft./min. and operating temperatures ranging from room temperature to about 300° F. The results of tests on a number of dryer bearing oils, including those of the present invention, are shown in the attached drawing.

Some additional data are included in Table I. It may be noted that the product of Example I gave substantially lower friction torque and coefficient of friction at low journal speeds and at almost all conditions of loading than four other commercial oils. It was particularly superior as the load on the journal was increased. The friction torque and the coefficient of friction when the load reached 1450 p. s. i. was, in general, about one-fourth to one-third of that in the various commercial lubricants tested for comparative purposes.

Where filter systems are used for by-pass reconditioning of the oil it is desirable that the filtering medium be of such type that they will not remove the additive from the oil. Filters using clay tend to remove the additive rapidly and it is preferable to use filters of the diatomaceous earth type where filters are incorporated in the lubricating system.

It will be understood that various types of oils may be used and that various conventional additives such as soaps, thickeners, antioxidants, corrosion inhibitors and the like may be used in conventional proportions without departing from the spirit and purpose of the present invention.

What is claimed is:

A lubricating composition comprising a major proportion of a mineral lubricating oil having a viscosity between 50 and 200 S. S. U. at 210° F., about 0.1 to 0.5% by weight of fatty acid selected from the group consisting of stearic acid and mixtures of stearic acid and palmitic acid, about 0.02 to 0.2% by weight of a $C_{16}$ aliphatic substituted succinic acid, about 0.3 to 1.0% by weight of tricresyl phosphate, and about 0.2 to 0.5% by weight of oxidation inhibitor selected from the group consisting of phenyl alpha naphthylamine, ditertiary butyl para cresol and mixtures thereof.

References Cited in the file of this patent

UNITED STATES PATENTS

| | | |
|---|---|---|
| 2,073,841 | Humphreys et al. | Mar. 16, 1937 |
| 2,203,102 | Powers | June 4, 1940 |
| 2,349,044 | Jahn | May 16, 1944 |
| 2,442,672 | Fuchs et al. | June 1, 1948 |
| 2,472,503 | Minne | June 7, 1949 |
| 2,459,717 | Perry | June 18, 1949 |
| 2,477,356 | Wayo | July 26, 1949 |
| 2,474,604 | Wassen et al. | June 28, 1949 |